US008276445B2

(12) United States Patent
Reiche

(10) Patent No.: US 8,276,445 B2
(45) Date of Patent: Oct. 2, 2012

(54) HOLDING DEVICE FOR AN ULTRASONIC TRANSDUCER

(75) Inventor: Martin Reiche, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 12/305,152

(22) PCT Filed: Jul. 12, 2007

(86) PCT No.: PCT/EP2007/057168

§ 371 (c)(1), (2), (4) Date: May 21, 2009

(87) PCT Pub. No.: WO2008/025608

PCT Pub. Date: Mar. 6, 2008

(65) Prior Publication Data

US 2009/0314575 A1 Dec. 24, 2009

(30) Foreign Application Priority Data

Aug. 29, 2006 (DE) ........................ 10 2006 040 344

(51) Int. Cl.
*G01D 11/10* (2006.01)

(52) U.S. Cl. ........................................................ 73/430

(58) Field of Classification Search ..................... 73/430
See application file for complete search history.

(56) References Cited

U.S. PATENT DOCUMENTS 3,100,292 A * 8/1963 Warner, Jr. et al. ........... 367/185
4,216,404 A * 8/1980 Kurtz et al. .................. 310/338
4,705,981 A 11/1987 Inoue et al.
4,754,440 A * 6/1988 Naruse .......................... 367/140
5,329,819 A * 7/1994 Park et al. ....................... 73/724
5,339,292 A * 8/1994 Brown et al. ................. 367/176
5,632,669 A * 5/1997 Azarian et al. .................. 451/54
6,085,592 A * 7/2000 Kawashima .................... 73/632
6,094,402 A * 7/2000 Cooper et al. ................ 367/188
6,374,676 B1 * 4/2002 Arnold et al. ................... 73/632
6,375,028 B1 * 4/2002 Smith ........................ 220/258.1
6,425,321 B1 * 7/2002 Yip ................................ 99/510
6,438,288 B1 * 8/2002 Tehrani ........................... 385/27
6,532,193 B1 3/2003 Fehse et al.

(Continued)

FOREIGN PATENT DOCUMENTS

DE 19755729 6/1999

(Continued)

OTHER PUBLICATIONS

International Search Report, PCT International Patent Application No. PCT/EP2007/057168, dated Mar. 13, 2008.

*Primary Examiner* — Lisa Caputo
*Assistant Examiner* — Jamel Williams
(74) *Attorney, Agent, or Firm* — Kenyon & Kenyon LLP

(57) ABSTRACT

A holding device for an ultrasonic transformer having a diaphragm cup, in particular for a motor vehicle, includes the following: a housing to accommodate the diaphragm cup; a decoupling component to position the diaphragm cup on the housing and on a holding section in vibration-damped manner; and a filler material to connect the diaphragm cup and the decoupling component to the housing in a vibration-damped and sealing, form-fitting manner, the decoupling component sealingly filling a gap between an edge of an opening of the housing and the diaphragm cup, as well as a corresponding method.

6 Claims, 1 Drawing Sheet

U.S. PATENT DOCUMENTS

| | | | | |
|---|---|---|---|---|
| 7,273,205 | B2 * | 9/2007 | Dalmasso et al. | 251/28 |
| 7,357,431 | B2 * | 4/2008 | Sato et al. | 293/117 |
| 7,392,705 | B2 * | 7/2008 | Kawashima et al. | 73/632 |
| 7,570,544 | B2 * | 8/2009 | Kalbhenn et al. | 367/174 |
| 7,583,563 | B2 * | 9/2009 | Nakajima | 367/188 |
| 2003/0089172 | A1 | 5/2003 | Kupfernagel et al. | |
| 2003/0121331 | A1 | 7/2003 | Mitsuoka et al. | |
| 2006/0241474 | A1 | 10/2006 | Kawashima et al. | |
| 2008/0130416 | A1 * | 6/2008 | Kalbhenn et al. | 367/174 |
| 2009/0301205 | A1 * | 12/2009 | Reiche | 73/632 |
| 2009/0314575 | A1 * | 12/2009 | Reiche | 181/148 |
| 2010/0296692 | A1 * | 11/2010 | Reiche | 381/423 |

FOREIGN PATENT DOCUMENTS

| | | |
|---|---|---|
| DE | 102006014053 | 10/2006 |
| EP | 1310942 | 5/2003 |
| JP | 1296182 | 11/1989 |
| JP | 2009-540706 | 11/2009 |
| WO | WO 00/50853 | 8/2000 |
| WO | WO 0079513 A1 * | 12/2000 |

* cited by examiner

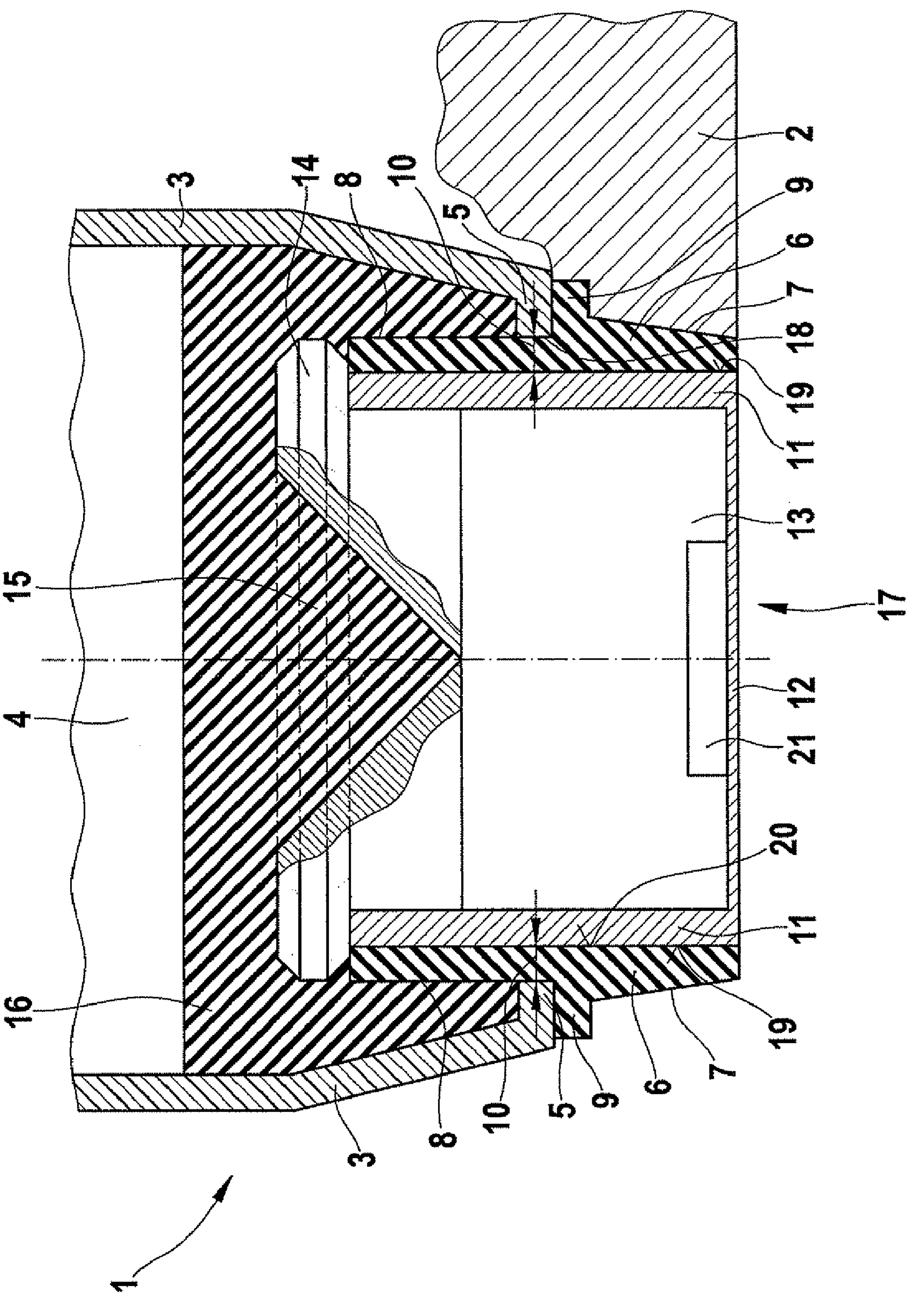
1
2
3
4
5
6
7
8
9
10
11
12
13
14
15
16
17
18
19
20
21

HOLDING DEVICE FOR AN ULTRASONIC TRANSDUCER

FIELD OF THE INVENTION

The present invention relates to a holding device for an ultrasonic transducer and to a corresponding method for its production.

BACKGROUND INFORMATION

Ultrasonic transducers of this type are used in ultrasonic sensors in motor vehicles, for instance as parking aid. These sensors are generally made up of a housing, which accommodates a diaphragm cup in whose interior a transformer element is disposed. The transformer element (e.g., a piezo element) is mounted on the bottom of the diaphragm cup, the bottom also being referred to as diaphragm. In the installed state, the outer surface of the diaphragm is exposed and excited by the transformer element for the emission of ultrasonic waves. Furthermore, it receives the ultrasonic waves reflected off an object. The ultrasonic transformer is situated inside the housing in such a way that the greatest low-acoustic impedance decoupling is obtained. The ultrasonic sensor is installed in a suitable vehicle section, e.g., in a shock absorber, with the aid of a receptacle that likewise has a decoupling function.

The fixation of the diaphragm cup in the housing is realized by, for example, a first inner decoupling ring, as it is referred to, which at least partially encloses the diaphragm cup and is joined to the housing via a holding sleeve mounted thereon by clipping, for example. A second decoupling ring mounted on the diaphragm cup forms a support in the associated vehicle section. The decoupling rings are made from a damping material such as silicon. Disadvantageous in this context are the number of parts and the production/assembly expense.

In another development, instead of being provided with the inner decoupling ring, the housing is filled with a damping material for the inner suspension of the diaphragm cup. One possibility in this context is an injected filler or damping material of silicon. Such a form-locking bond has been tried and tested but the associated production time and expense is disadvantageously high. For example, the extrusion coating with the damping material requires a tool that seals in a downward direction, i.e., to the side of the exposed diaphragm of the diaphragm cup, which tool must enclose the diaphragm cup and the housing in form-locking manner until the extrusion-coated damping material, e.g., a vulcanization, has hardened completely. This sealing tool has to bridge a gap between the diaphragm cup and the wall of the housing, which has a minimum thickness, in order for the diaphragm cup to exhibit the low acoustic impedance decoupling once the housing has been extrusion-coated. In addition, following the vulcanization, a cutting tool has to remove the last traces of the extrusion coat at the edge to the diaphragm cup before the second decoupling ring is able to be mounted. Apart from the production time, the fact that such tools are relatively expensive constitutes a disadvantage.

One example to illustrate this is described in German Patent Application No. DE 197 55 729 A1, which describes an ultrasonic sensor having a housing with a plug-in connection, an ultrasonic transducer, and a circuit board, the housing being subdivided into a support and a surrounding protective cover. A decoupling ring is provided to mount the ultrasonic transducer inside the housing in sealing and vibration-damped fashion. A casting compound completely fills up the ultrasonic transducer and forms a mechanically durable and tight encapsulation of the ultrasonic sensor.

SUMMARY

In contrast, the holding device for an ultrasonic transducer according to the present invention has the advantage of satisfying the requirement with regard to low-impedance acoustic decoupling by a low number of components, and of dispensing with an additional holding sleeve. Another advantage is that during the extrusion coating process, one component simultaneously acts as seal between the housing and the diaphragm cup in that it sealingly bridges a gap in-between. Thus, there is no need for a sealing tool, its high cost and production time in batch processing (vulcanization). Furthermore, this component remains behind after the extrusion coating and forms the outer support in the vehicle section. The working step of the cleaning operation to remove remaining traces of the extrusion coat is therefore omitted during the production, which yields savings in time and cost.

According to the present invention, the holding device for an ultrasonic transducer includes a decoupling component, which in an extrusion coating process using a filler material, serves as seal for it until it has hardened and which subsequently establishes low-impedance acoustic decoupling between the ultrasonic transducer and the housing and between the ultrasonic transducer and a vehicle section in the finished ultrasonic sensor.

According to the present invention, the holding device for an ultrasonic transducer having a diaphragm cup, especially for a vehicle, includes the following:

- a housing to accommodate the diaphragm cup;
- a decoupling component to position the diaphragm cup on the housing and on a holding section in vibration-damped manner; and
- a filler material to connect the diaphragm cup and the decoupling component to the housing in vibration-damped and sealing, form-fitting manner, the decoupling part sealingly filling a gap between an edge of the housing and the diaphragm cup. This results in a holding device that advantageously has a low number of components.

In one preferred development, the decoupling component encloses an outer area of the diaphragm cup at least sectionally. This has the advantage that the diaphragm cup retains low acoustic impedance as a result of the decoupling component.

In a further development, the decoupling component preferably has a front section to be accommodated in the holding section, and a rear section disposed in the interior of the housing. This advantageously results in a multiple function of the decoupling component in that it forms a support inside the housing and for a vehicle section, and low-acoustic impedance support of the diaphragm cup is established in the decoupling component for both holding areas.

Furthermore, in one preferred development, the front section and the rear section of the decoupling component are separated by a segment that projects radially outward and rests against an edge of the housing. This segment forms an advantageous separation of the front section and the rear section of the decoupling component, while a support or a stop for the housing is formed at the same time. The rear section of the decoupling component is surrounded by the filler material in sealing as well as form-fitting and force-locking manner, and establishes a connection to the extrusion-coated filler material at the same mechanical impedance in this region, so that excellent axial wall damping of the diaphragm cup is possible so as to suppress interfering vibrational content. Furthermore, due to the extrusion coating, there is no need for an additional sleeve to connect the decoupling component to the housing.

In another preferred development, the diaphragm cup has a lid, which has a recess to dampen the lid. This results in an additional advantageous decoupling of the diaphragm cup as well as in damping of undesired vibrational content.

In one especially preferred development the recess in the lid of the diaphragm cup is filled with the filler material in order to dampen the lid. This forms what is termed a wave sump, which dampens additional interfering vibrational content. It is especially advantageous in this context that the filler material for filling the housing may be used for the lid as well, which means that a production step to pre-fill the lid recess is able to be omitted, Time may be saved in this manner.

An example method according to the present invention for producing a holding device for an ultrasonic transducer having a diaphragm cup, the holding device including the following:

- a housing to accommodate the diaphragm cup in an interior chamber;
- a decoupling component to position the diaphragm cup on the housing and on a holding section in a vibration-damped manner; and
- a filler material to connect the diaphragm cup and the decoupling component to the housing in vibration-damped and sealing, form-fitting manner, includes the following method steps:

(S1) at least sectional mounting of the decoupling component on an outer surface of the diaphragm cup;

(S2) inserting the diaphragm cup with a rear section of the decoupling component in an opening of the housing; and S3) at least partially filling the interior chamber of the housing with the filler material to produce the holding device for the ultrasonic transducer.

A special advantage is that the filling of the interior chamber with the filler material may be accomplished in a single method step without additional cleaning steps, so that time may be saved.

In another preferred development, the decoupling component forms a seal of a gap in the opening between the housing and the outer surface of the diaphragm cup in the at least partial filling of the interior chamber of the housing. In an especially advantageous manner, this dispenses with a sealing form tool as well as with a subsequent cleaning step, which saves production time and expense.

In yet another preferred development, a recess in a lid of the diaphragm cup is filled with filler material to dampen the lid in the at least partial filling of the interior chamber of the housing with filler material. This advantageously saves a pre-production step for filling the lid with a filler material, which yields additional cost savings.

Further advantages and features of the present invention may be gathered from the description and the FIGURE.

BRIEF DESCRIPTION OF THE DRAWING

Below, the present invention is explained in greater detail with reference to the exemplary embodiment shown in the FIGURE.

The FIGURE shows a schematic sectional view of an exemplary embodiment of a holding device for an ultrasonic transducer according to the present invention.

DETAILED DESCRIPTION OF EXAMPLE EMBODIMENTS

Identical or similar component parts having identical or similar functions are provided with matching reference numerals in the figures.

The single FIGURE shows an exemplary embodiment of a holding device 1 for an ultrasonic transducer 17. The components in this exemplary embodiment are dynamically balanced and shown in a sectional view.

In this exemplary embodiment, ultrasonic transducer 17 includes a diaphragm cup 11 having a diaphragm cup interior chamber 13, which is sealed on one side (the bottom side in the figures) by a diaphragm 12 on which an ultrasonic transducer element 21 is affixed inside the interior chamber. No further details of diaphragm-cup interior chamber 13 are shown for reasons of clarity. The outer side of diaphragm 12 pointing in a downward direction is used for the emission of ultrasonic waves in response to being excited by the transducer element (not shown), and for the reception of ultrasonic waves reflected off objects, such waves being transmitted to the transducer element and exciting it to generate electrical voltage pulses. In this exemplary embodiment the other side of diaphragm cup 11 is sealed by a lid 14 having a recess 15, which widens in an upward direction and has a triangular cross section, so that a conical recess, for example, is produced. Lid 14 is made of a metallic material, for instance.

In this example, diaphragm cup 11 is made from aluminum material, for instance, and has an outer surface 19, which is completely surrounded by a decoupling component 6 via its inner surface 20. In another specific development, the upper edge region of diaphragm cup 11 may be exposed, for example, and not be surrounded by decoupling component 6.

In this exemplary embodiment, decoupling component 6 has a conical front section 7 that tapers in a downward direction, and a segment 9 abutting above, which extends radially toward the outside. Segment 9 forms a delimitation with respect to a cylindrical rear section 8. Decoupling component 6 is preferably produced from a damping material, such as a silicon material, and surrounds diaphragm cup 11 in form-fitting and sealing fashion.

Via rear section 8 of decoupling component 6, ultrasonic transducer 17 together with diaphragm cup 11 which decoupling component 6 encloses is disposed within an interior chamber 4 of a housing 3. It extends through an opening 18 at the lower side of housing 3. The lower section of housing 3 conically tapers in a downward direction beginning approximately at the level of lid 14 of diaphragm cup 11. In the upward direction, housing 3 has a cylindrical design, its upper section not being shown further. Housing 3 is made of a plastic material, for example.

The lower side of housing 3 has a circumferential edge 5, which rests on segment 9 of decoupling component 6. A circumferential gap 10, which is taken up by decoupling component 6, is present between edge 5 of housing 3 and outer surface 19 of diaphragm cup 11. Decoupling component 6 forms a mounting support of diaphragm 11 on housing 3 in this region, such support being formed in what is referred to as low-acoustic impedance manner. This means that housing 3 exerts no disruptive influence on diaphragm cup 11 and its diaphragm 12 in transmit and receive operation of ultrasonic transducer 17. At the same time, decoupling component 6 seals diaphragm 11 from housing 3 in gap 10, segment 9 also increasing the sealing and holding effect by a contact area at the underside of edge 5 of housing 3.

In interior chamber 4 of housing 3, ultrasonic transducer 17 is joined to housing 3 via a filler material 16 by way of rear section 8 of decoupling component 6 affixed on its outer surface 19. Filler material 16 is a damping material such as a silicon material, which is injection-molded into interior chamber 4. Filler material 16 forms a force- and form-locking support of ultrasonic transducer 17 on housing 3, decoupling component 6 plastically connecting to extrusion-coated filler material 16 at a similar impedance, and filler material 16 adhering to housing 3. This provides the advantage of excellent axially continuous damping of the wall of diaphragm cup 11 to suppress interfering vibrational content during operation of ultrasonic transducer 17. Filler material 16 also forms a seal of ultrasonic transducer 17 from housing 3 and the outside of housing 3. An additional sleeve to support ultrasonic transducer 17 on housing 3 may thus advantageously be dispensed with.

In this exemplary embodiment, diaphragm cup 11 is sealed by lid 14 at its upper face. Lid 14 is surrounded by filler material 16 in form-locking manner as well.

In this example, front section 7 of decoupling component 6 serves as support in a holding section 2 of the vehicle, e.g., its shock absorber. Front section 7 therefore forms a low-acoustic impedance support of ultrasonic transducer 17 in holding section 2.

An example method for producing a holding device 1 of ultrasonic transducer 17 is described in the following text. Premanufactured diaphragm cup 11 of ultrasonic transducer 17 is sealed by lid 14. Decoupling component 6 is mounted in its entirety or in part on diaphragm cup 11 with form-locking. Diaphragm cup 11 is then inserted into housing 3 through opening 18 via the side sealed by lid 14, until the lower side of edge 5 of housing 3 comes to rest on segment 9. Gap 10 between edge 5 and outer surface 19 of diaphragm cup 11 is sealingly closed with the aid of decoupling component 6, so that no filler material is able to leak during the subsequent filling operation of interior chamber 4 of housing 3 with filler material 16. As a result, a sealing tool that surrounds the diaphragm cup as well as the housing in form-locking manner until hardening of the extrusion-coated damping material, e.g., a vulcanization, has been completed, may advantageously be dispensed with for this operation. This sealing tool would have to bridge gap 10 between diaphragm cup 11 and edge 5 of housing 3 if diaphragm 11 is to exhibit the low-acoustic impedance decoupling following the extrusion coating of housing 3. In addition, a cutting tool would then have to remove the last traces of the extrusion coating at edge 5 and on diaphragm cup 11 following the vulcanization.

Interior chamber 4 is completely or partially filled with filler material 16, the FIGURE showing a fill level of filler material 16 disposed above lid 14 of diaphragm cup 11 that corresponds to the approximate thickness of the lid. No further cleaning operation of ultrasonic transducer 17 disposed outside of housing 3 is advantageously required once the filled-in filler material 16 has hardened or vulcanized since the front section of decoupling component 6 forms a mounting support for the installation in holding section 2 of the vehicle and does not have to be cleaned of filler material 16.

In an advantageous manner, the extrusion coating with filler material 16 may therefore be employed as single method step; a holding device 1 of ultrasonic transducer 17 is formed jointly with decoupling component 6 using a minimum number of components and providing high damping.

The present invention is not limited to the exemplary embodiments described above but is modifiable in a variety of ways.

For example, in the premanufacture of diaphragm cup 11 there may be no need to fill lid 14 having recess 15 with additional damping material inside recess 15; instead, filler material 16 also fills up recess 15 of lid 14 when interior chamber 4 of housing 3 is filled. This advantageously saves a preparatory step.

What is claimed is:

1. A holding device for an ultrasonic transducer having a diaphragm cup for a motor vehicle, comprising:

a housing to accommodate at least a portion of the diaphragm cup; a decoupling component to position the diaphragm cup on the housing and on a holding section of the motor vehicle in vibration-damped manner, wherein the decoupling component surrounds an entire lateral exterior side of the diaphragm cup; and a filler material to connect the diaphragm cup and the decoupling component to the housing in vibration-damped and sealing, form-fitting manner; wherein the decoupling element has a front section and a rear section, wherein the rear section of the decoupling component extends into the interior of the housing and sealingly fills a gap between an edge of an opening of the housing and the diaphragm cup- and wherein the front section of the decoupling component extends out of the housing and directly contacts the holding section of the motor vehicle, and wherein the filler material connects a rear section of the diaphragm cup and the rear section of the decoupling component surrounding the rear section of the diaphragm cup to the housing.

2. The holding device as recited in claim 1, wherein the front section and the rear section of the decoupling component are separated by a segment that projects radially toward an outside and rests against an edge of the housing.

3. The holding device as recited in claim 1, wherein the diaphragm cup has a lid, which has a recess for damping the lid.

4. The holding device as recited in claim 3, wherein the recess of the lid of the diaphragm cup is filled with the filler material to dampen the lid.

5. A method for producing a holding device for an ultrasonic transducer having a diaphragm cup for a motor vehicle, the holding device including a housing to accommodate at least a portion of the diaphragm cup, a decoupling component to position the diaphragm cup on the housing and on a holding section of the motor vehicle in vibration-damped manner, and a filler material to connect the diaphragm cup and the decoupling component to the housing in vibration-damped and sealing, form-fitting manner, the method comprising:

at least section mounting the decoupling component on a lateral exterior side of the diaphragm cup such that the decoupling component surrounds the entire lateral exterior side of the diaphragm cup;

inserting a rear section of the diaphragm cup surrounded by a rear section of the decoupling component into an opening of the housing such that a front section of the decoupling component extends out of the housing to enable direct contact between the front section of the decoupling component and the holding section of the motor vehicle; and at least partially filling the interior chamber of the housing with the filler material to produce the holding device for the ultrasonic transducer, wherein the rear section of the decoupling component forms a seal of a gap in the opening between the housing and an outer surface of the diaphragm cup during the at least partial filling of the interior chamber of the housing.

6. The method as recited in claim 5, wherein a recess of a lid of the diaphragm cup is filled with form material to dampen the lid during the at least partial filling of the interior chamber of the housing with form material.

* * * * *